(12) United States Patent
Yamamoto

(10) Patent No.: US 11,842,115 B2
(45) Date of Patent: Dec. 12, 2023

(54) PRINTER AND NON-TRANSITORY COMPUTER-READABLE RECORDING MEDIUM STORING COMPUTER-READABLE INSTRUCTIONS FOR PRINTER

(71) Applicant: BROTHER KOGYO KABUSHIKI KAISHA, Nagoya (JP)

(72) Inventor: Ryo Yamamoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/178,933

(22) Filed: Mar. 6, 2023

(65) Prior Publication Data
US 2023/0205473 A1 Jun. 29, 2023

Related U.S. Application Data

(63) Continuation of application No. 17/644,480, filed on Dec. 15, 2021, now Pat. No. 11,625,211.

(30) Foreign Application Priority Data

Dec. 25, 2020 (JP) .................................. 2020-217547

(51) Int. Cl.
*G06F 3/12* (2006.01)

(52) U.S. Cl.
CPC .......... *G06F 3/1288* (2013.01); *G06F 3/1203* (2013.01); *G06F 3/1236* (2013.01); *G06F 3/1271* (2013.01); *G06F 3/1292* (2013.01)

(58) Field of Classification Search
CPC .... G06F 3/1288; G06F 3/1203; G06F 3/1236; G06F 3/1271; G06F 3/1292
See application file for complete search history.

(56) References Cited

U.S. PATENT DOCUMENTS

| 10,067,724 | B2 | 9/2018 | Asada | |
| 2013/0061041 | A1* | 3/2013 | Inoue | G06F 21/608 |
| | | | | 713/156 |
| 2015/0046451 | A1 | 2/2015 | Yamada | |
| 2015/0070727 | A1* | 3/2015 | Asada | G06F 3/1236 |
| | | | | 358/1.15 |

FOREIGN PATENT DOCUMENTS

JP    2015-054412 A    3/2015

OTHER PUBLICATIONS

Notice of Allowance dated Dec. 9, 2022 from parent application U.S. Appl. No. 17/644,480.

* cited by examiner

*Primary Examiner* — Quang N Vo
(74) *Attorney, Agent, or Firm* — Scully, Scott, Murphy & Presser, PC

(57) ABSTRACT

A printer may include a controller configured to: in a case where a predetermined instruction is obtained from a user under a situation where a service state of the printer for receiving a print job providing service from a server is a disabled state, shift the service state from the disabled state to an enabled state; in a case where a registration instruction to register printer information related to the printer in the server is obtained, send the printer information to the server; in a case where the registration instruction is obtained under the situation where the service state is the disabled state, shift the service state from the disabled state to the enabled state without obtaining the predetermined instruction from the user.

7 Claims, 5 Drawing Sheets

(First Embodiment : Case B)

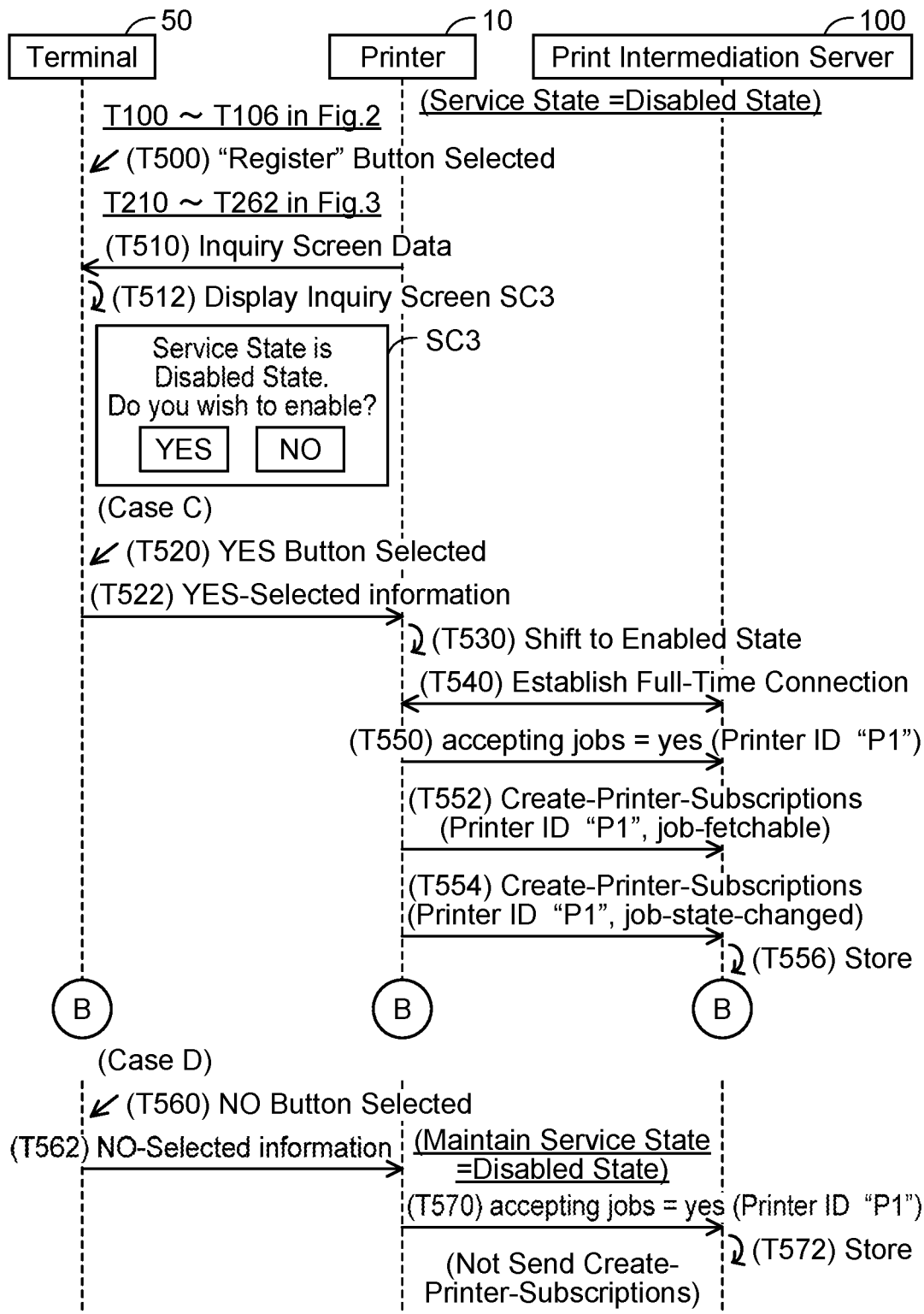

PRINTER AND NON-TRANSITORY COMPUTER-READABLE RECORDING MEDIUM STORING COMPUTER-READABLE INSTRUCTIONS FOR PRINTER

CROSS-REFERENCE TO RELATED APPLICATION

This application is a continuation application of U.S. Ser. No. 17/644,480 filed on Dec. 15, 2021 and claims priority to Japanese Patent Application No. 2020-217547, filed on Dec. 25, 2020, the entire contents of which are incorporated herein by reference.

BACKGROUND

A cloud print system provided with a printer and a server is known. When a print job is added to the server, the printer receives the print job from the server and executes printing therefor.

SUMMARY

The description herein discloses an art for a printer to suitably receive a print job from a server.

A printer disclosed herein may comprise: a print engine; and a controller, wherein the controller is configured to: in a case where a predetermined instruction is obtained from a user under a situation where a service state of the printer for receiving a print job providing service from a server is a disabled state, shift the service state from the disabled state to an enabled state, the disabled state being a state incapable of receiving from the server a print job according to Internet Printing Protocol (IPP), and the enabled state being a state capable of receiving from the server the print job according to the IPP; in a case where a registration instruction to register printer information related to the printer in the server is obtained, send the printer information to the server; in a case where the registration instruction is obtained under the situation where the service state is the disabled state, shift the service state from the disabled state to the enabled state without obtaining the predetermined instruction from the user; and in a case where the print job according the IPP is received from the server after the printer information has been registered in the server and the service state has been shifted from the disabled state to the enabled state, cause the print engine to print according to the print job.

According to the above-mentioned configuration, in the case where the printer obtains the registration instruction under the situation where the service state of the printer is the disabled state, the printer shifts the service state from the disabled state to the enabled state without obtaining the predetermined instruction from the user. Due to this, an occurrence of a situation where the printer cannot receive the print job from the server due to the service state being the disabled state, despite the printer information having been registered in the server, can be suppressed. Thus, the printer can suitably receive a print job from the server.

A computer-readable instructions for the aforementioned printer, a non-transitory computer-readable recording medium storing the computer-readable instructions, and a method executed by the aforementioned printer are also novel and useful. Further, a system comprising the aforementioned printer and the server is also novel and useful.

BRIEF DESCRIPTION OF DRAWINGS

FIG. 6 shows a sequence diagram of a second embodiment.

DETAILED DESCRIPTION

Figure 1:
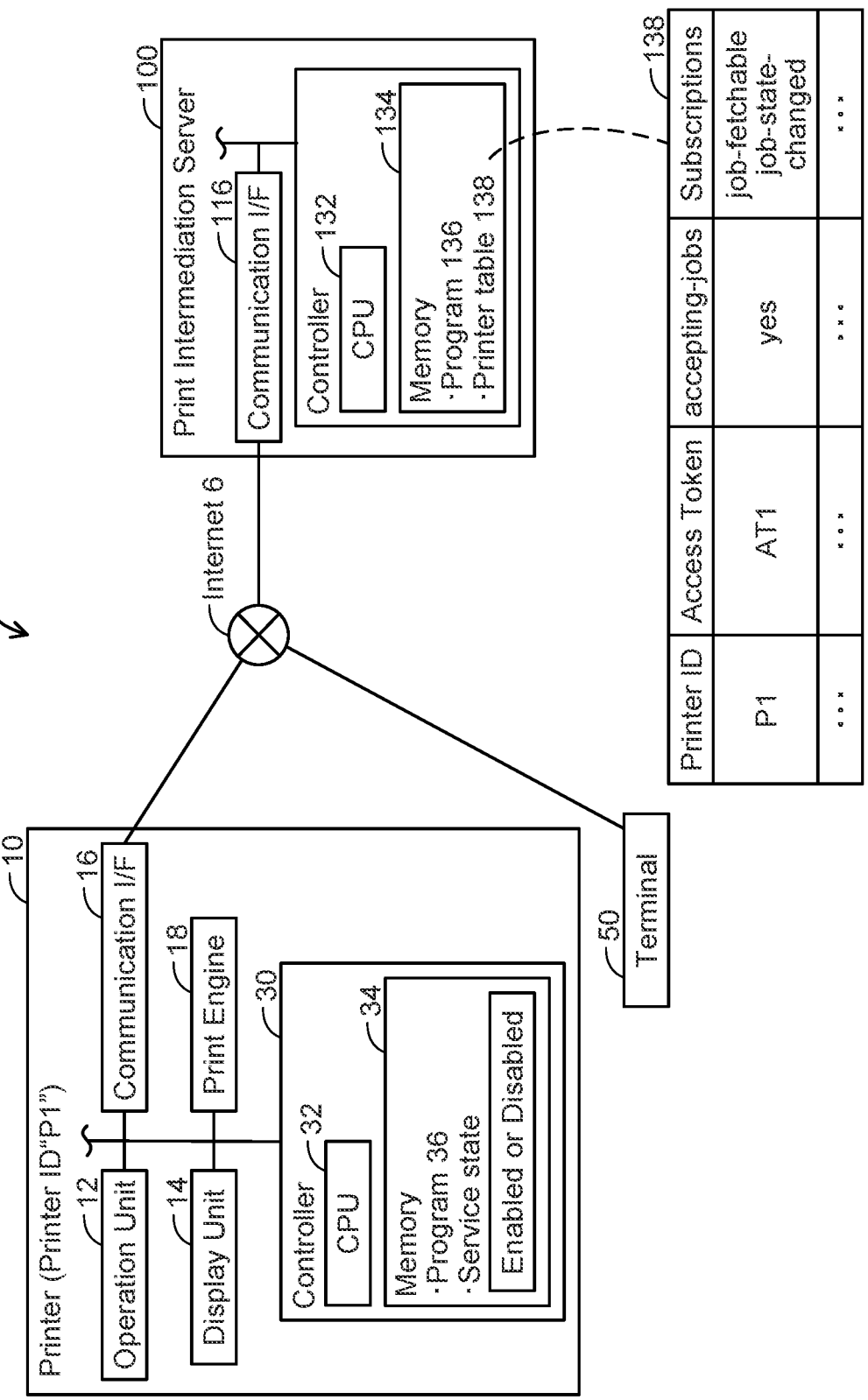
FIG. 1 shows a configuration of a communication system.

First Embodiment (Configuration of Communication System: FIG. 1)

As shown in FIG. 1, a communication system 2 comprises a printer 10, a terminal 50, and a print intermediation server 100. The respective devices 10, 50, 100 are connected to Internet 6 and configured capable of communicating with each other through the Internet 6.

(Configuration of Printer 10)

The printer 10 is a peripheral device configured to execute print function (e.g., a peripheral device of the terminal 50). In a variant, the printer 10 may be a multifunction peripheral configured to execute scan function and FAX function. A printer ID "P1" for identifying the printer 10 is assigned to the printer 10. The printer 10 comprises an operation unit 12, a display unit 14, a communication interface 16, a print engine 18, and a controller 30. The respective units 12 to 30 are connected to a bus line (reference sign omitted). Hereinbelow, an interface will be termed "I/F".

The operation unit 12 includes a plurality of keys. A user can input various instructions to the printer 10 by operating the operation unit 12. The display unit 14 is a display for displaying various types of information. The display unit 14 also functions as a touch panel (i.e., operation unit) that accepts instructions from the user. The communication I/F 16 is connected to the Internet 6. The print engine 18 includes a print mechanism of an inkjet scheme or a laser scheme, for example.

The controller 30 includes a CPU 32 and a memory 34. The CPU 32 is configured to execute various processes according to a program 36 stored in the memory 34. The memory 34 is constituted of a volatile memory and a nonvolatile memory, for example. The memory 34 further stores a service state for receiving a job providing service (which is in other words cloud print service) according to Internet Printing Protocol (IPP) from the server 100.

The service state indicates either one of "enabled", indicating that the printer 10 can receive a job from the server 100, and "disabled", indicating that the printer 10 cannot receive a job from the server 100. Hereinbelow, a state in which the service state in the memory 34 indicates "enabled" and a state in which the service state in the memory 34 indicates "disabled" may respectively be expressed as "the service state of the printer 10 is in an enabled state" and "the service state of the printer 10 is in a disabled state".

(Configuration of Terminal 50)

The terminal 50 may for example be a portable terminal such as a cellphone, smartphone, PDA, notebook PC, and tablet PC. In a variant, the terminal 50 may be a stationary terminal device such as a desktop PC. The terminal 50 comprises an operation unit, a display unit, a communication I/F, and a controller, although they are not shown.

(Configuration of Print Intermediation Server 100)

Hereinbelow, the print intermediation server 100 will be abbreviated as "server 100". The server 100 is a server configured to provide a cloud print service. The server 100 is a server established on the Internet 6 by a business entity (e.g., a business entity that provides the cloud print service) different from a vendor of the printer 10. In a variant, the server 100 may be established by the vendor of the printer 10. The server 100 is configured to generate a job and send this job to the printer 10 when it receives image data from the terminal 50, for example. The job includes print data that is generated by converting the image data into a data format which the printer 10 can interpret.

The server 100 comprises a communication I/F 116 and a controller 130. The respective units 116 and 130 are connected to a bus line (reference sign omitted). The communication I/F 116 is connected to the Internet 6.

The controller 130 includes a CPU 132 and a memory 134. The CPU 132 is configured to execute various processes according to a program 136 stored in the memory 134. The memory 134 is constituted of a volatile memory and a nonvolatile memory, for example. The memory 134 further stores a printer table 138.

The printer table 138 is a table for storing a printer ID, an access token, accepting-jobs, and Subscriptions in association with each other. The access token is information that is to be used by the server 100 in authentication of the printer 10 upon when a request according to the IPP is communicated between the printer 10 and the server 100. Further, the access token is used for establishing a full-time connection between the printer 10 and the server 100. In the present embodiment, the printer 10 realizes operations such as the full-time connection by using a persistent connection according to Hyper Text Transfer Protocol (HTTP). In a variant, the full-time connection may be a connection according to eXtensible Messaging and Presence Protocol (XMPP). The accepting jobs is information indicating a printer attribute according to the IPP, and specifically, it is information indicating whether or not the server 100 accepts print requests. The accepting-jobs indicates either one of "yes" indicating that the server 100 accepts print requests and "no" indicating that the server 100 does not accept print requests. Here, "accepting print requests" means that the server 100 generates jobs in response to receiving the print requests. "Not accepting print requests" means that the server 100 does not generate jobs despite receiving the print requests. The Subscriptions is information indicating events which the server 100 should monitor and notify.

Figure 2:
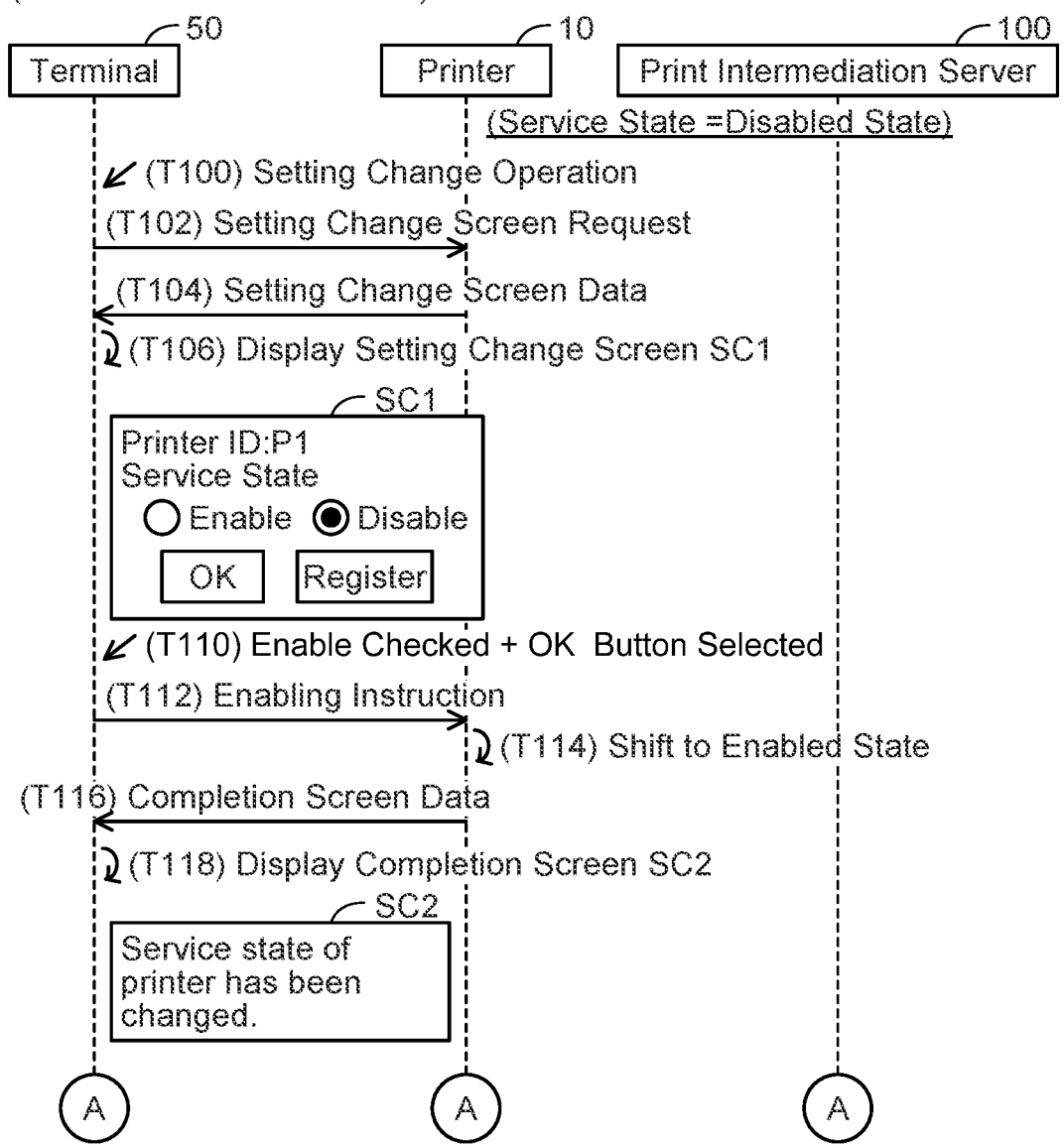
FIG. 2 shows a sequence diagram of Case A of a first embodiment.

(Processes of Case A Executed by Devices 10, 50, 100: FIG. 2)

Processes of Case A will be described with reference to FIG. 2. Case A is a case in which information related to the printer 10 is registered in the server 100 after the service state of the printer 10 is changed from the disabled state to the enabled state. Hereinbelow, for easier understanding, operations which the CPUs (e.g., CPU 32) of the respective devices execute may be described with the respective devices (e.g., printer 10) as a subject of action instead of describing the CPU as the subject of action. Further, all communication executed by the devices 10, 100 is executed via the communication I/Fs 16, 116. Due to this, the description "via the communication I/F 16 (or 116)" will be omitted.

The terminal 50 is configured to access a web server in the printer 10 in response to accepting an operation by the user. Further, in response to accepting a setting changing operation by the user in T100, the terminal 50 sends a setting change screen request to the printer 10 in T102.

When the setting change screen request is received from the terminal 50 in T102, the printer 10 sends setting change screen data representing a setting change screen SC1 to the terminal 50.

When the setting change screen data is received from the printer 10 in T104, the terminal 50 displays the setting change screen SC1 in T106. The setting change screen SC1 is a screen for configuring settings related to the cloud print service, and includes the printer ID "P1", a check box for setting the service state in the enabled state, a check box for setting the service state in the disabled state, an OK button, and a "register" button for registering the information related to the printer 10 in the server 100. At present, since the service state of the printer 10 is the disabled state, the check box for "disabled" is checked in the setting change screen SC1.

In T110, the terminal 50 accepts user's selection of the OK button after having accepted an operation for checking the check box for "enabled" in the setting change screen SC1. In this case, the terminal 50 sends an enabling instruction to the printer 10 in T112.

When the enabling instruction is received from the terminal 50 in T112, the printer 10 shifts the service state from the disabled state to the enabled state in T114. Specifically, the printer 10 changes the service state in the memory 34 from "disabled" to "enabled". Then, in T116, the printer 10 sends completion screen data representing a completion screen SC2 to the terminal 50.

When the completion screen data is received from the printer 10 in T116, the terminal 50 displays the completion screen SC2 in T118. The completion screen SC2 includes a message indicating that the service state of the printer 10 has been changed. Due to this, by looking at the completion screen SC2, the user can confirm that change to the service state of the printer 10 has been completed.

Figure 3:
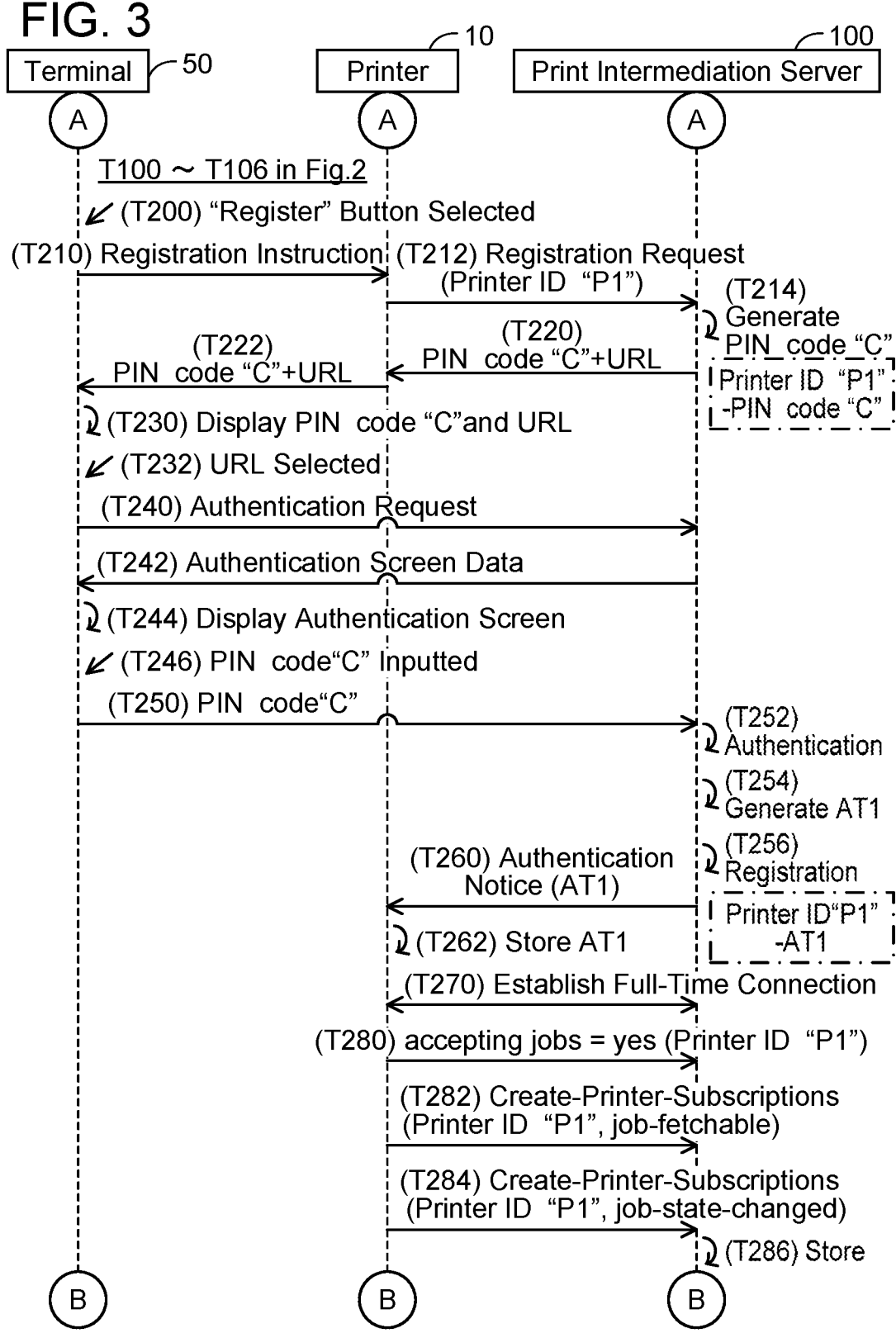
FIG. 3 shows a sequence diagram continued from FIG. 2.

(Continuation of FIG. 2: FIG. 3)

After the above, processes similar to T100 to T106 of FIG. 2 are executed. At present, since the service state of the printer 10 is the enabled state (see T114 of FIG. 2), the check box for "enabled" is checked in the setting change screen SC1 in T106 of FIG. 2 as applied to FIG. 3. In T200, the terminal 50 accepts user's selection of the "register" button in the setting changing screen SC1. In this case, the terminal 50 sends a registration instruction to the printer 10 in T210.

When the registration instruction is received from the terminal 50 in T210, the printer 10 sends a registration request including the printer ID "P1" to the server 100 in T212.

When the registration request is received from the printer 10 in T212, the server 100 generates a PIN code "C" in T214. In a variant, a password may be used instead of the PIN code. Further, the server 100 stores the printer ID "P1" included in the registration request and the generated PIN code "C" in association with each other in the memory 134. Then, in T220, the server 100 sends the PIN code "C" and a login Uniform Resource Locator (URL) to the printer 10. The login URL is information indicating a location of authentication screen data (to be described later) within the server 100.

When the PIN code "C" and the URL are received from the server 100 in T220, the printer 10 sends them to the terminal 50 in T222.

When the PIN code "C" and the URL are received from the printer 10 in T222, the terminal 50 displays them in T230. Then, in T232, when the terminal 50 accepts user's operation of selecting the URL, it sends an authentication request including the URL to the server 100 in T240.

When the authentication request is received from the terminal 50 in T240, the server 100 sends authentication screen data specified by the URL included in the authentication request to the terminal 50 in T242. The authentication screen data is data representing an authentication screen for inputting a PIN code.

When the authentication screen data is received from the server 100 in T242, the terminal 50 displays the authentication screen in T244. Then, in T246, the terminal 50 accepts user's input of the PIN code "C" displayed in T230. In this case, the terminal 50 sends the inputted PIN code "C" to the server 100 in T250.

When the PIN code "C" is received from the terminal 50 in T250, the server 100 executes authentication of the received PIN code "C" in T252. Specifically, the server 100 determines whether or not the received PIN code "C" is already stored. In a case of determining that the received PIN code "C" is already stored, that is, in a case where the authentication is successful, the server 100 generates an access token AT1 which is a unique character string in T254. Then, in T256, the server 100 stores the generated access token AT1 in the printer table 138 in association with the printer ID "P1" stored in T214. After this, in T260, the server 100 sends an authentication notice including the generated access token AT1 to the printer 10.

When the authentication notice is received from the server 100 in T260, the printer 10 stores in T262 the access token AT1 included in the authentication notice in the memory 34.

In T270, the printer 10 establishes a full-time connection with the server 100 by using the stored access token AT1. By using the full-time connection, the server 100 can send signals to the printer 10 over a firewall of the LAN to which the printer 10 belongs without receiving requests from the printer 10. That is, the full-time connection is a connection capable of executing server-push communication. The full-time connection is maintained until the service state of the printer 10 shifts to the disabled state.

In T280 to T284, the printer 10 sends various commands including the printer ID "P1" to the server 100. The command of T280 is a command for registering "yes" as the accepting-jobs in the server 100. Due to this, the server 100 can be caused to execute acceptance of print requests. Each of the commands in T282 and T284 is a Create-Printer-Subscriptions (hereinbelow termed "CPS"). The CPS is a command for registering a new event as a Subscriptions in the server 100.

The CPS in T282 is a command for registering job-fetchable in the server 100. The job-fetchable is an event for accepting print requests. That is, the CPS of T282 is an instruction for causing the server 100 to monitor acceptance of print requests and notify the printer 10 that a print request has been accepted.

The CPS in T284 is a command for registering job-state-changed in the server 100. The job-state-changed is an event of a change in a job status. That is, the CPS in T284 is an instruction for causing the server 100 to monitor a change in a job status and to notify the printer 10 that a change in the job status has happened. In a variant, the processes of T282 and T284 may be realized by a single CPS. That is, the printer 10 may send one CPS for registering both the job-fetchable and the job-state-changed in the server 100.

When the respective commands are received from the printer 10 in T280 to 284, the server 100 stores information thereof in the printer table 138 in T286. Specifically, the server 100 stores "yes" as the accepting-jobs in association with the printer ID "P1" included in the command of T280. The server 100 further stores the job-fetchable and the job-state-changed as Subscriptions in association with the printer ID "P1" included in the CPS in each of T282 and T284.

Figure 4:
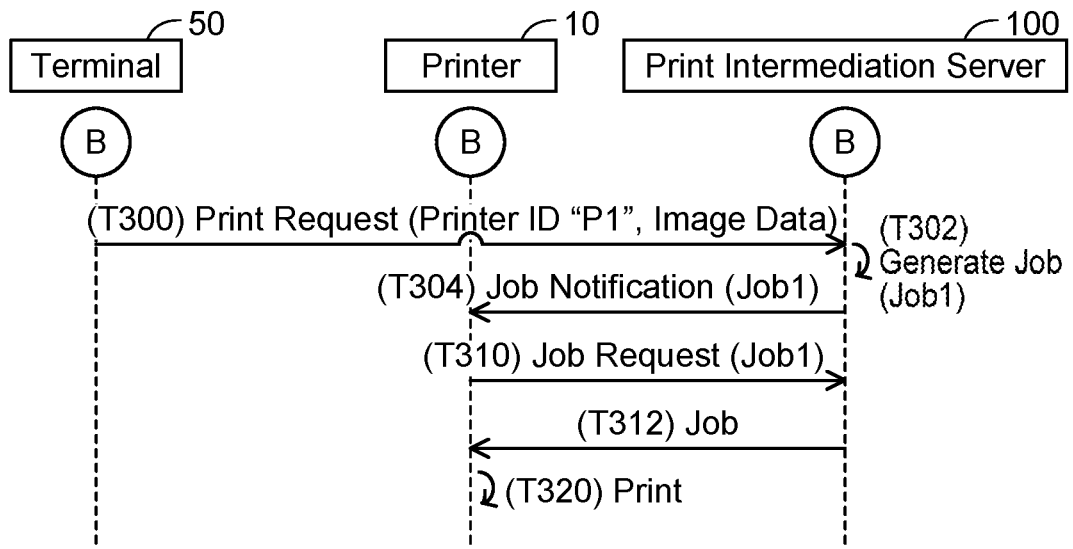
FIG. 4 shows a sequence diagram continued from FIG. 3.

(Continuation of FIG. 3: FIG. 4)

In response to accepting user's instruction including a designation of a printer which is to execute printing (which is the printer 10 in the present case) and a designation of a print target image, the terminal 50 sends a print request to the server 100 in T300. The print request includes the printer ID "P1" identifying the printer 10 designated by the user and image data representing the print target image.

When the print request is received from the terminal 50 in T300, the server 100 firstly specifies the printer ID "P1" included in the request from the printer table 138. Then, the printer 10 determines whether the accepting jobs associated with the printer ID "P1" in the printer table 138 indicates "yes" or "no". In the present case, since the accepting-jobs indicates "yes" (see T280 and T286 of FIG. 3), the server 100 accepts the print request. That is, the server 100 generates a job identified by a job ID "Job1" in T302. Specifically, the server 100 firstly converts the image data received from the terminal 50 and generates print data having a data format which the printer 10 can interpret. Then, the server 100 stores the printer ID "P1", the job ID "Job1", and the print data in association with each other in the memory 134.

Next, the server 100 determines whether the job-fetchable is stored as the Subscriptions associated with the printer ID "P1" in the printer table 138. In the present case, since the job-fetchable is stored (see T282 and T286 of FIG. 3), the server 100 notifies the printer 10 that a print request accepting event has occurred. That is, the server 100 sends a job notification to the printer 10 in T304 by using the full-time connection (see T270 of FIG. 3). This job notification indicates that a job has been generated, and include the job ID "Job1" generated in T302.

When the job notification is received from the server 100 in T304, the printer 10 sends a job request including the job ID "Job1" to the server 100 in T310.

When the job request is received from the printer 10 in T310, the server 100 specifies the print data stored in association with the job ID "Job1" included in this job request. Then, in T312, the sever 100 sends the job including this print data to the printer 10.

When the job including the print data is received from the server 100 in T312, the printer 10 supplies this print data to the print engine 18 in T320. Due to this, printing of the image represented by the print data is executed by the print engine 18. As above, the printer 10 can execute printing of images using the cloud print service.

Although not shown in the case of FIG. 4, the server 100 may receive an instruction for cancelling the job identified by the job ID "Job1" from the terminal 50. In this case, the server 100 determines whether the job-state-changed is stored as the Subscriptions associated with the printer ID "P1" in the printer table 138. In the present case, since the job-state-changed is stored (see T284 and T286 of FIG. 3), the server 100 notifies the printer 10 that a job status-changing event has occurred. That is, the server 100 sends a status-change notice which indicates that the job has been cancelled to the printer 10 by using the full-time connection (see T270 of FIG. 3). Due to this, the printer 10 can stop printing for the job identified by the job ID "Job1". The status-change notice is not limited to those indicating that a job has been cancelled, but may indicate pausing printing according to a job.

Figure 5:
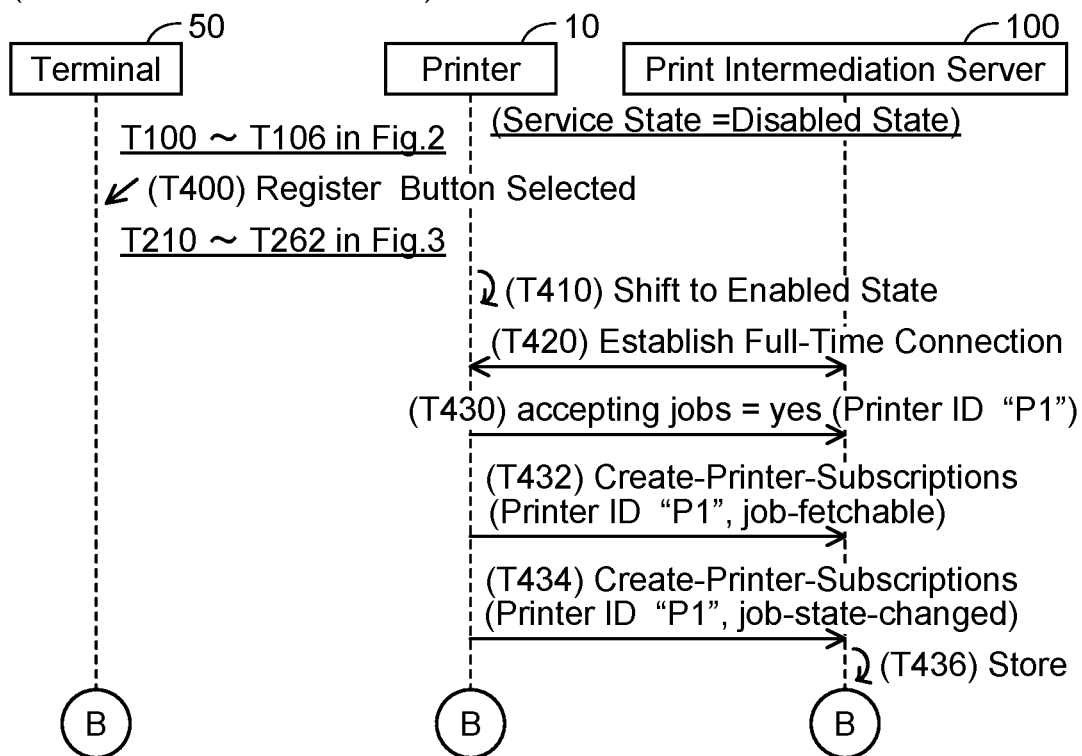
FIG. 5 shows a sequence diagram of Case B of the first embodiment.

(Processes of Case B Executed by Devices 10, 50, 100: FIG. 5)

Processes of Case B will be described with reference to FIG. 5. Case B is a case in which the information related to the printer 10 is registered in the server 100 in a situation where the service state of the printer 10 is the disabled state.

Processes similar to T100 to T106 of FIG. 2 are executed. In T400, the terminal 50 accepts user's selection of the "register" button within the setting change screen SC1. In this case, processes similar to T210 to T262 of FIG. 3 are executed.

In T410, the printer 10 shifts the service state from the disabled state to the enabled state even without receiving the enabling instruction in T112 of FIG. 2 from the terminal 50. The process of T410 is similar to T114 of FIG. 2. After this, although not shown in FIG. 5, processes similar to T116 and T118 of FIG. 2 may be executed.

Next, in T420, the printer 10 establishes the full-time connection with the server 100. The process of T420 is similar to T270 of FIG. 3. After this, in T430 to T434, the printer 10 sends various commands to the server 100. The processes of T430 to T434 are similar to T280 to T284 of FIG. 3. Due to this, the server 100 can be caused to accept print requests and also can be caused to notify acceptance of a print request and notify a job status change.

A process of T436 executed by the server 100 is similar to T286 of FIG. 3. When the process of FIG. 5 is completed, a process similar to FIG. 4 is executed.

Effect of First Embodiment

According to the present embodiment, in the case where the printer 10 obtains the registration instruction in the situation where the service state is the disabled state (T210 of FIG. 3 as applied in FIG. 5), it shifts the service state from the disabled state to the enabled state without obtaining the enabling instruction for shifting the service state to the enabled state from the user (see T112 of FIG. 2) (T410). Due to this, the printer 10 shifts from a state of not having the full-time connection established to the state of having the full-time connection established (T420), as a result of which it can suitably receive the job notification from the server 100 by using the full-time connection (T304 of FIG. 4). Thus, the printer 10 can suitably receive the job from the server 100 (T312).

In the present embodiment, when the printer 10 shifts the service state from the disabled state to the enabled state, it establishes the full-time connection with the server 100. In a variant, when the printer 10 shifts the service state from the disabled state to the enabled state the printer 10 may repeatedly send a polling signal to the server 100 without establishing the full-time connection with the server 100. That is, the disabled state may be a state in which the polling signal is not sent to the server 100 and the enabled state may be a state in which the polling signal is sent to the server 100. In this case, the server 100 can send the job notification and the status-change notice to the printer 10 as a response to the polling signal. In this variant as well, the printer 10 can receive the job notification and the status-change notice from the server 100.

In either of the embodiment and variants as above, the printer 10 automatically shifts the service state from the disabled state to the enabled state in the case of obtaining the registration instruction in the situation where the service state is the disabled state. That is, the printer 10 automatically shifts from a state incapable of receiving the job notification from the server 100 to a state capable of receiving the job notification from the server 100. Due to this, an occurrence of a situation where the printer 10 cannot receive the job from the server 100 because of the service state being the disabled state despite the printer ID "P1" being registered in the server 100 is suppressed. Thus, the printer 10 can suitably receive the print job from the server 100.

(Corresponding Relationship)

The enabling instruction in T112 of FIG. 2 is an example of "predetermined instruction". The printer ID "P1" is an example of "printer information". The print request is an example of "job sending request". The command in T280, the command in T282, and the command in T284 of FIG. 3 are respectively an example of "acceptance instruction", "first notifying instruction", and "second notifying instruction".

The process of T114 of FIG. 2 is an example of "in a case where a predetermined instruction is obtained . . . shift the service state from the disabled state to an enabled state". The processes of T212 and T280 to T282 of FIG. 3 are respectively an example of " . . . send the printer information to the server" and "in a case where the registration instruction is obtained under the situation where the service state is the enabled state, send an acceptance instruction according to the IPP and a first notifying instruction according to the IPP to the server". The process of T320 of FIG. 4 is an example of " . . . cause the print engine to print according to the print job". The processes of T410 and T430 to T434 of FIG. 5 are respectively an example of "shift the service state from the disabled state to the enabled state without obtaining the predetermined instruction" and "in the case where the registration instruction is obtained under the situation where the service state is the disabled state, send an acceptance instruction according to the IPP and a first notifying instruction according to the IPP to the server", and " . . . send a second notifying according to the IPP to the server".

Second Embodiment; FIG. 6

A second embodiment will be described with reference to FIG. 6. In the second embodiment, inquiry screen data is sent from the printer 10 to the terminal 50 in the case of registering the information related to the printer 10 in the server 100 in the situation where the service state of the printer 10 is the disabled state. Each process in FIG. 6 is a process executed as a replacement to its corresponding process in FIG. 5 of the first embodiment.

Processes similar to T100 to T106 of FIG. 2 are executed. In T400, the terminal 50 accepts the user's selection of the "register" button in the setting change screen SC1. In this case, processes similar to T210 to T262 of FIG. 3 are executed. After this, in T510, the printer 10 sends the inquiry screen data representing an inquiry screen SC3 to the terminal 50.

When the inquiry screen data is received from the printer 10 in T510, the terminal 50 displays the inquiry screen SC3 in T512. The inquiry screen SC3 includes a message inquiring whether to shift the service state from the disabled state to the enabled state, a YES button, and a NO button.

(Case C)

In Case C, the terminal 50 accepts user's selection of the YES button in the inquiry screen SC3 in T520. In this case, in T522, the terminal 50 sends the printer 10 YES-selected information indicating that the YES button has been selected.

When the YES-selected information is received from the terminal 50 in T522, the printer 10 shifts the service state from the disabled state to the enabled state in T530. That is, the printer 10 shifts the service state from the disabled state to the enabled state without receiving the enabling instruction in T112 of FIG. 2 from the terminal 50. Processes of T540 to T554 are similar to the processes of T420 to T434 of FIG. 5. When the process of Case C is completed, process similar to FIG. 4 is executed.

(Case D)

In Case D, the terminal 50 accepts user's selection of the NO button in the inquiry screen SC3 in T560. In this case, in T562, the terminal 50 sends the printer 10 NO-selected information indicating that the NO button has been selected.

When the NO-selected information is received from the terminal 50 in T562, the printer 10 maintains the service state in the disabled state. That is, the printer 10 does not establish the full-time connection with the server 100. Then, in T570, the printer 10 sends the server 100 the command for registering "yes" as the accepting-jobs. However, the printer 10 does not send any CPS to the server 100.

In T572, the server 100 stores "yes" as the accepting-jobs in the printer table 138. However, the server 100 does not store the job-fetchable and the job-state-changed as the Subscriptions. As such, although the server 100 accepts print requests (i.e., generates and stores jobs) but does not send the job notification and the status-change notice to the printer 10.

Effect of Second Embodiment

According to the present embodiment, in the case of registering the information related to the printer 10 in the server 100 in the situation where the service state is the disabled state, the printer 10 sends the inquiry screen data to the terminal 50 (T510). For example, when the user wishes to use the cloud print service right away, the user can select the YES button in the inquiry screen SC3. In this case, the printer 10 automatically shifts the service state from the disabled state to the enabled state. As such, the printer 10 can suitably receive the print job from the server 100. When the user does not wish to use the cloud print service right away, the user can select the NO button in the inquiry screen SC3. Then, the printer 10 can switch between shifting the service state to the enabled state (Case C) and maintaining the service state in the disabled state (Case D) in response to an inquiry result obtained from the user.

Especially in the case of maintaining the service state in the disabled state (Case D), the printer 10 does not send the CPS to the server 100. Due to this, an occurrence of a situation where the server 100 monitors the event of accepting print requests and the event of the job status change despite the full-time connection not being established between the printer 10 and the server 100 (i.e., despite the server 100 not being able to notify the printer 10) can be suppressed. As a result, processing load on the server 100 resulting from monitoring the events can be suppressed from becoming high.

(Corresponding Relationship)

The display unit of the terminal 50 is an example of "display unit". The process of T510, the processes of T550 to T552, and the process of T570 of FIG. 6 are respectively an example of " . . . cause a display unit to display an inquiry screen", "in a case where the registration instruction is obtained under the situation where the service state is the disabled state and it is selected by the user in the inquiry screen that the service state is to be shifted to the enabled state, send an acceptance instruction according to the IPP and a first notifying instruction according to the IPP to the server", and " . . . send the acceptance instruction to the server without sending the first notifying instruction to the server".

(Variant 1)

In the above embodiments, the user uses the terminal 50 to access the web server in the printer 10 and provides the enabling instruction and the registration instruction to the printer 10 (for example, T112 of FIG. 2, T210 of FIG. 3). Instead of this, the user may provide the enabling instruction and the registration instruction to the printer 10 by operating the operation unit 12 of the printer 10. In this variant, the enabling instruction and the registration instruction obtained by the operation on the operation unit 12 are respectively an example of the "predetermined instruction" and the "registration instruction".

(Variant 2)

In the above embodiments, when the service state of the printer 10 shifts to the enabled state, the respective commands in T280 to T284 of FIG. 3, T430 to T434 of FIG. 5, and T550 to T554 of FIG. 6 are sent to the server 100. Further, in T570 of FIG. 6 as well, the command is sent to the server 100. In a variant, these commands may not be sent to the server 100. In this case, the server 100 may be configured to send the job notification and the status-change notice to the printer 10 without receiving these commands. In this variant, "an acceptance instruction", "a first notifying instruction", and "a second notifying instruction" may be omitted.

(Variant 3)

In the second embodiment, the printer 10 sends the inquiry screen data to the terminal 50 (T510) and causes the inquiry screen SC3 to be displayed on the display unit of the terminal 50. Instead of this, the printer 10 may cause the display unit 14 of the printer 10 to display the inquiry screen SC3. In this variant, the display unit 14 of the printer 10 is an example of the "display unit".

(Variant 4)

In each of the above-described embodiments, each process of FIGS. 2 to 6 is realized by software (e.g., programs 36, 136), however, at least one of those processes may be realized by hardware such as logic circuit.

What is claimed is:

1. A printer comprising:
a print engine; and
a controller,
wherein the controller is configured to:
in a case where a predetermined instruction is obtained from a user under a situation where a service state of the printer for receiving a print job providing service from a server is a disabled state, shift the service state from the disabled state to an enabled state, the disabled state being a state incapable of receiving from the server a print job according to Internet Printing Protocol (IPP), and the enabled state being a state capable of receiving from the server the print job according to the IPP;
in a case where a registration instruction to register printer information related to the printer in the server is obtained under the situation where the service state is the enabled state, send the printer information to the server;
in a case where the printer information is sent to the server, send an acceptance instruction according to the IPP and a first notifying instruction according to the IPP to the server, the acceptance instruction being for causing the server to accept a job sending request, the job sending request being a request for sending the print job to the printer via the server, and the first notifying instruction being for causing the server to notify the printer that the server has accepted the job sending request; and in a case where the print job according the IPP is received from the server after the printer information has been registered in the server and the acceptance instruction and the first notifying instruction have been sent to the server, cause the print engine to print according to the print job.

2. The printer as in claim 1, wherein the controller is further configured to:

in the case where the printer information is sent to the server, send a second notifying instruction according to the IPP to the server, the second notifying instruction being for causing the server to notify the printer that a status of the print job has been changed.

3. The printer as in claim 1, wherein the controller is further configured to:

in the case where the printer information is sent to the server, establish a server-push communication with the server.

4. The printer as in claim 1, wherein the controller is further configured to:

in a case where the registration instruction is obtained under the situation where the service state is the disabled state, shift the service state from the disabled state to the enabled state without obtaining the predetermined instruction from the user.

5. The printer as in claim 1, wherein the controller is further configured to:

in the case where the registration instruction is obtained under the situation where the service state is the disabled state, cause a display unit to display an inquiry screen, the inquiry screen being for inquiring of the user whether the service state is to be shifted to the enabled state, wherein in a case where it is selected by the user in the inquiry screen that the service state is to be shifted to the enabled state, the controller is configured to shift the service state from the disabled state to the enabled state without obtaining the predetermined instruction from the user, and in a case where it is selected by the user in the inquiry screen that the service state is not to be shifted to the enabled state, the service state is maintained in the disabled state.

6. The printer as in claim 5, wherein the controller is further configured to:

in a case where the registration instruction is obtained under the situation where the service state is the disabled state and it is selected by the user in the inquiry screen that the service state is not to be shifted to the enabled state, send the acceptance instruction to the server without sending the first notifying instruction to the server.

7. A non-transitory computer-readable recording medium storing computer-readable instructions for a printer:

the computer-readable instructions, when executed by a processor of the printer, cause the printer to:

in a case where a predetermined instruction is obtained from a user under a situation where a service state of the printer for receiving a print job providing service from a server is a disabled state, shift the service state from the disabled state to an enabled state, the disabled state being a state incapable of receiving from the server a print job according to Internet Printing Protocol (IPP), and the enabled state being a state capable of receiving from the server the print job according to the IPP;

in a case where a registration instruction for registering printer information related to the printer in the server is obtained, under the situation where the service state is the enabled state, send the printer information to the server;

in a case where the printer information is sent to the server, send an acceptance instruction according to the IPP and a first notifying instruction according to the IPP to the server, the acceptance instruction being for causing the server to accept a job sending request, the job sending request being a request for sending the print job to the printer via the server, and the first notifying instruction being for causing the server to notify the printer that the server has accepted the job sending request; and in a case where the print job according the IPP is received from the server after the printer information has been registered in the server and the acceptance instruction and the first notifying instruction have been sent to the server, cause a print engine to print according to the print job.

* * * * *